US012218982B1

(12) United States Patent
Bird et al.

(10) Patent No.: US 12,218,982 B1
(45) Date of Patent: Feb. 4, 2025

(54) CLOUD SECURITY CONTROL PLATFORM THAT ENFORCES SCOPE-BASED SECURITY CONTROLS

(71) Applicant: Sonrai Security Inc., New York, NY (US)

(72) Inventors: William Alexander Bird, Upper Kingsclear (CA); Ben Alexander Wuest, Fredericton (CA); Matthew Aaron Rogers Carle, Fredericton (CA); Brad Joseph Peters, Fredericton (CA); Gregory Andrew Davis, Mazerolle Settlement (CA); Joshua Luke Laver, Harvey (CA); Veranika Hadun, Fredericton (CA); Carter James MacLennan, Fredericton (CA); Dasharath Parasottam Chavda, Ottawa (CA); Christopher Glen Fredericks, Hanwell (CA)

(73) Assignee: Sonrai Security Inc., New York, NY (US)

( * ) Notice: Subject to any disclaimer, the term of this patent is extended or adjusted under 35 U.S.C. 154(b) by 0 days.

(21) Appl. No.: 18/755,777

(22) Filed: Jun. 27, 2024

Related U.S. Application Data

(60) Provisional application No. 63/605,231, filed on Dec. 1, 2023.

(51) Int. Cl.
*H04L 29/06* (2006.01)
*H04L 9/40* (2022.01)

(52) U.S. Cl.
CPC ............ *H04L 63/20* (2013.01); *H04L 63/101* (2013.01)

(58) Field of Classification Search
CPC ... H04L 63/20; H04L 63/101; H04L 63/0263; H04L 63/0209; H04L 63/102; H04L 63/104
USPC ............................................................ 726/1
See application file for complete search history.

(56) References Cited

U.S. PATENT DOCUMENTS

| | | | |
|---|---|---|---|
| 9,860,249 B2 | 1/2018 | Dulkin et al. | |
| 10,432,631 B2* | 10/2019 | Kaushal | H04L 63/168 |
| 10,728,234 B2* | 7/2020 | Guo | G06F 21/629 |
| 10,728,307 B2 | 7/2020 | Wuest et al. | |
| 11,206,269 B1 | 12/2021 | Van Deman | |
| 11,340,085 B2 | 5/2022 | Mahajan et al. | |

(Continued)

OTHER PUBLICATIONS

"Service Control Policies," excerpted from AWS Organizations: User Guide, 2024 https://docs.aws.amazon.com/organizations/latest/userguide/orgs_manage_policies_scps.html.

*Primary Examiner* — Longbit Chai
(74) *Attorney, Agent, or Firm* — David H. Judson (57) ABSTRACT

A cloud security control platform and method enforces security controls across multiple cloud environments, services and disparate teams while providing a frictionless "Permissions on Demand" mechanism for approvals and exceptions. In contrast to the prior art, security is evaluated on a permission by permission basis, with the default being that all permissions are denied and then only given to a particular identity on an as-needed basis. This approach reduces the security risks associated with the vast capabilities available in Public Cloud environments and permits an organization that uses the platform to grant access, approve exceptions and delegate approvals with the appropriate compliance.

13 Claims, 6 Drawing Sheets

400

| CLOUD PROVIDER | FORMAT | CAVEATS |
|---|---|---|
| AMAZON WEB SERVICES (AWS) | aws/\<organization\>/\<organizational unit\>/\<account\> | ORGANIZATIONAL UNITS CAN BE RECURSIVE |
| GOOGLE PUBLIC CLOUD (GCP) | gcp/\<organization\>/ \<folder\>/\<project\> | FOLDERS CAN BE RECURSIVE |
| MICROSOFT AZURE (AZURE) | azure/\<tenant\>/\<management group\>/\<subscription\> | MANAGEMENT GROUPS CAN BE RECURSIVE |

(56) References Cited

U.S. PATENT DOCUMENTS

| | | |
|---|---|---|
| 11,411,733 B1 | 8/2022 | Dailey et al. |
| 11,637,864 B2* | 4/2023 | Raff .................. H04L 41/40 |
| | | 726/2 |
| 11,930,017 B1 | 3/2024 | Hadun et al. |
| 11,943,261 B1 | 3/2024 | Durand et al. |
| 11,962,620 B2 | 4/2024 | Parekh et al. |
| 12,021,900 B1 | 6/2024 | Gladney et al. |
| 12,028,346 B1 | 7/2024 | Cannard et al. |
| 2014/0244851 A1 | 8/2014 | Lee |
| 2016/0253352 A1* | 9/2016 | Kluck ................ H04L 67/1095 |
| | | 707/638 |
| 2017/0171214 A1 | 6/2017 | Anderson et al. |
| 2017/0295197 A1 | 10/2017 | Parimi et al. |
| 2020/0296119 A1 | 9/2020 | Lim et al. |
| 2020/0379793 A1 | 12/2020 | Parihar et al. |
| 2021/0352077 A1 | 11/2021 | Benedetti et al. |
| 2021/0352136 A1 | 11/2021 | Dojka et al. |
| 2021/0392142 A1 | 12/2021 | Stephens et al. |
| 2023/0094856 A1 | 3/2023 | Ithal et al. |
| 2024/0129340 A1 | 4/2024 | Ramaswamy et al. |
| 2024/0155003 A1 | 5/2024 | Gulati et al. |
| 2024/0214386 A1 | 6/2024 | Barton et al. |
| 2024/0283826 A1 | 8/2024 | Ganguli et al. |
| 2024/0297886 A1 | 9/2024 | Kumar et al. |

\* cited by examiner

| CLOUD PROVIDER | FORMAT | CAVEATS |
|---|---|---|
| AMAZON WEB SERVICES (AWS) | aws/<organization>/<organizational unit>/<account> | ORGANIZATIONAL UNITS CAN BE RECURSIVE |
| GOOGLE PUBLIC CLOUD (GCP) | gcp/<organization>/<folder>/<project> | FOLDERS CAN BE RECURSIVE |
| MICROSOFT AZURE (AZURE) | azure/<tenant>/<management group>/<subscription> | MANAGEMENT GROUPS CAN BE RECURSIVE |

| DATA | DESCRIPTION |
|---|---|
| 502 — CLOUD CONTROLS | ALL CLOUD CONTROLS THAT ARE AVAILABLE TO THE SYSTEM |
| 504 — CLOUD HIERARCHY | CLOUD HIERARCHIES OF PUBLIC CLOUD ENVIRONMENTS THAT HAVE BEEN LOADED INTO THE SYSTEM AND EXTRACTED BY DATA ENRICHMENT SERVICES |
| 506 — OWNERS/APPROVERS | OWNERS/APPROVERS THAT HAVE BEEN ASSIGNED TO VARIOUS SCOPES IN THE CLOUD HIERARCHY |
| 508 — APPLIED CONTROL MAPPINGS | ALL THE CONTROLS THAT HAVE BEEN CURRENTLY APPLIED TO THE ATTACHED PUBLIC CLOUD ENVIRONMENT |
| 510 — STAGE CONTROL MAPPINGS | ALL CONTROLS THAT ARE CURRENTLY BEING WORKED ON/STAGED IN THE SYSTEM |
| 512 — APPLIED CONTROL EXCEPTIONS | ALL THE EXCEPTIONS THAT HAVE BEEN CURRENTLY APPLIED TO THE ATTACHED PUBLIC CLOUD ENVIRONMENTS |
| 514 — STAGED CONTROL EXCEPTIONS | ALL THE CONTROL EXCEPTIONS BEING WORKED ON/STAGED IN THE SYSTEM |
| 516 — CLOUD TRANSACTIONS | TRANSACTION RECORDS OF MAPPINGS THAT HAVE BEEN APPLIED TO THE ATTACHED CLOUD ENVIRONMENTS |
| 518 — PERMISSIONS ON DEMAND REQUESTS | PERMISSIONS ON DEMAND REQUEST RECORDS |

FIG. 5

| FUNCTION | DESCRIPTION |
|---|---|
| RESTRICT | THE CONTROL IS APPLIED INTO THE PUBLIC CLOUD ENVIRONMENT USING NATIVE CONTROLS SO THAT THE SERVICE/REGION/PERMISSIONS ARE PROHIBITED |
| EXCEPTIONS | THE CONTROL IS APPLIED INTO THE PUBLIC CLOUD ENVIRONMENT WITH THE EXPECTIONS THAT HAVE BEEN LISTED SO THAT SERVICE IS NOT DISRUPTED FOR THE APPROVED IDENTITIES |
| MONITOR | THE CONTROL IS APPLIED INTO THE PUBLIC CLOUD ENVIRONMENT SO THAT IF/WHEN VIOLATIONS TO THE CONTROL OCCUR THE CLOUD SECURITY CONTROL PLATFORM IS IMMEDIATELY NOTIFIED |
| DRIFT DETECTION | ALL OF THE ABOVE INFRASTRUCTURE FOR RESTRICT/EXCEPT AND MONITOR ARE APPLIED INTO THE PUBLIC CLOUD ENVIRONMENT WITH DRIFT DETECTION SO THAT IF ANY DRIFT IS DETECTED TO THIS FABRIC THE CLOUD SECURITY CONTROL PLATFORM IS NOTIFIED IMMEDIATELY |

FIG. 6

CLOUD SECURITY CONTROL PLATFORM THAT ENFORCES SCOPE-BASED SECURITY CONTROLS

BACKGROUND OF THE INVENTION

This application relates generally to cloud compute infrastructures and, in particular, to techniques to model and manage data across multiple cloud deployments.

Public cloud environments consist of many services designed to enable velocity in application delivery cycles. Every quarter, new cloud services are offered and existing services are augmented. Each cloud service carries with it permissions and/or configurations that have various levels of security risk (often that are dependent on how they are used). Development teams as they transition or develop applications to the cloud will often over provision access to the underlying services. These factors, combined with the dynamic, low trust characteristics of public cloud environments, can often result in an over provisioned cloud carrying a substantial amount of security risk. Cloud services and the data contained by them are unnecessarily accessible to many identities in those cloud environments.

Through all of this, cloud environments often end up in a state where the security exposure risk is high. Commonly available cloud security tooling will outline and rank risk in these environments. In many situations, the risk outlined is not a priority to the development team and/or there are too many that they could possibly consume. Even though the risk is there, it is impossible to be consumed/operationalized by the organization. In the case of Identity Exposure, the risk of changing permissions on an identity can often unknowingly impact the business due to the lack of visibility into the access that identity actually needs. Organizations are faced with climbing the mountain of unraveling the security of the cloud fabric that has been rapidly built (often by multiple teams) and contains a substantial amount of security risk.

For organizations, being able to lock out the use of cloud services, reduce the use of sensitive permissions on those services, or control specifically how those services can be used throughout their entire cloudscape, is incredibly important. Individual cloud providers provide their own panes of glass to control access at a macro level and there are countless mechanisms to scan applications for issues pre- and post-deployment. All of these mechanisms rely on a complex tooling operationalization in the organization. Being able to control the cloud environments from a central perspective and having the ability to add exceptions/approvals for business critical applications and flows is crucial to actually improving the security posture of these cloud environments.

In the prior art, and in the context of a typical public cloud environment, developers create significant security risks, albeit unintentionally, by providing identity-centric mechanisms by which identities are provisioned at will and associated with control mechanisms that grant permissions on an identity basis (i.e., identity-by-identity). In this common operating scenario, identities are over-privileged.

SUMMARY OF THE INVENTION

The disclosure provides for a Cloud Security Control Platform (CSCP) that is able to enforce security controls across multiple cloud environments, services and disparate teams while in one embodiment also providing a frictionless "Permissions on Demand" mechanism for approvals and exceptions. This approach is central for organizations to reduce the security risks associated with the vast capabilities available in Public Cloud environments and to permit the organization to grant access, approve exceptions and delegate approvals with the appropriate compliance.

The control paradigm enforced by the CSCP inverts the common identity-centric model. In this approach, and in onr embodiment, security is evaluated on a permission-by-permission basis, with the default being that—with respect to a given scope in the provider's cloud environment—all permissions (or a given subset of one or more permissions) are denied and then only given to a particular identity on an as-needed basis. In other words, in the example embodiment permissions are always denied, typically at a specified scope (which may be the entire cloud), and then only selectively allowed (with respect to the scope) for a particular identity thereafter. In a typical operating scenario, the permissions for a given identity thus are done, usually in real-time, by the CSCP in an automated manner using the Permissions On Demand Service (or as otherwise necessary by an associated human approver).

The foregoing has outlined some of the more pertinent features of the disclosed subject matter. These features should be construed to be merely illustrative. Many other beneficial results can be attained by applying the disclosed subject matter in a different manner or by modifying the invention as will be described.

BRIEF DESCRIPTION OF DRAWINGS

For a more complete understanding of the subject matter and the advantages thereof, reference is now made to the following descriptions taken in conjunction with the accompanying drawings, in which.

DETAILED DESCRIPTION OF THE INVENTION

By way of background, cloud computing is a model of service delivery for enabling on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. Available services models that may be leveraged in whole or in part include: Software as a Service (Saas) (the provider's applications running on cloud infrastructure); Platform as a service (PaaS) (the customer deploys applications that may be created using provider tools onto the cloud infrastructure); Infrastructure as a Service (IaaS) (customer provisions its own processing, storage, networks and other computing resources and can deploy and run operating systems and applications). Typically, a cloud computing infrastructure may comprise co-located hardware and software resources, or resources that are physically, logically, virtually and/or geographically distinct. Communication networks used to communicate to and from the platform services may be packet-based, non-packet based, and secure or non-secure, or some combination thereof. Typically, the cloud computing environment has a set of high level functional components that include a front end identity manager, a business support services (BSS) function component, an operational support services (OSS) function component, and the compute cloud components themselves.

According to this disclosure, the Cloud Security Control Platform (CSCP) described below may itself be part of the cloud compute infrastructure, or it may operate as a stand-alone service that executes in association with third party cloud compute services, such as Amazon® AWS, Microsoft® Azure, Google® Public Cloud, IBM® Soft-Layer®, and others. The acronym CSCP is not intended to be limiting, and the platform herein may sometimes be referred to in other ways, such as a security control platform or system.

Each of the functions described herein may be implemented in a hardware processor, as a set of one or more computer program instructions that are executed by the processor(s) and operative to provide the described function.

The server-side processing is implemented in whole or in part by one or more web servers, application servers, database services, and associated databases, data structures, and the like.

More generally, the techniques described herein are provided using a set of one or more computing-related entities (systems, machines, processes, programs, libraries, functions, or the like) that together facilitate or provide the functionality described above. In a typical implementation, a representative machine on which the software executes comprises commodity hardware, an operating system, an application runtime environment, and a set of applications or processes and associated data, networking technologies, etc., that together provide the functionality of a given system or subsystem. As described, the functionality may be implemented in a standalone machine, or across a distributed set of machines.

A front-end of the below-described infrastructure (e.g., a customer console or portal) is also representative of a web site (e.g., a set of one or more pages formatted according to a markup language). Interaction with the portal may also take place in an automated manner, or programmatically, and the portal may interoperate with other identity management devices and systems.

As further background, it is assumed that an enterprise has relationships with multiple cloud providers, with each cloud provider typically implementing a network-accessible cloud computing infrastructure. This is sometimes referred to herein as a "multi-cloud" deployment. An enterprise multi-cloud deployment typically is one in which there are multiple cloud accounts, data stores, and data movement within and across the various cloud deployments provided by the multiple cloud providers. As will be described, and according to this disclosure, a cloud data control (CDC) service provides an enterprise (typically, a service customer or "subscriber") the ability to generate and use a complete risk model of all identity and data relationships, including activity and movement across cloud accounts, cloud providers and third party data stores. Typically, the risk model is maintained by the CDC service provider and exposed to the enterprise customer via one or more display(s), typically web-accessible dashboards. Using the service, an enterprise subscriber obtains continuous visibility into a wide range of security concerns including multi-cloud security monitoring, data sovereignty, data exposure detection, audit tampering and identity governance. Data managed by the data model enables the service to provide the subscriber data risk dashboards that include, without limitation, (i) views by cloud accounts, geography, data and protection, user and identity, compliance, and public exposure; (ii) security alerts (e.g., over-privileged users with access to PII, failed privilege escalation attempts, audit functions disabled by user, unusual data movement, separation of duties violations, data movement to public network, shared credential violations, etc.), (iii) compliance dashboards indicating data sovereignty, data movement and identity relationships (e.g., GDPR, HIPAA, PCI dashboards, data sovereignty monitoring, data asset inventory, customized controls and compliance dashboards, monitoring PII data movement, etc.)

The CDC service typically is implemented by a service provider "as-a-service" on behalf of a participating enterprise customer. In a typical use case, the enterprise customer subscribes to the CDCaaS solution described herein. The enterprise includes its own on-premises infrastructure (networks, servers, endpoints, databases, etc.), internal IT teams (e.g., Security, Compliance, DevOps, etc.), as well as its relationships with one or more cloud providers that provide cloud-based infrastructure. Except to the extent the enterprise internal systems and the cloud provider infrastructure(s) interoperate with the CDC service (typically via data exchange), the subscriber and cloud provider infrastructures are external to the CDC service, which typically is operated and managed separately.

Figure 1:
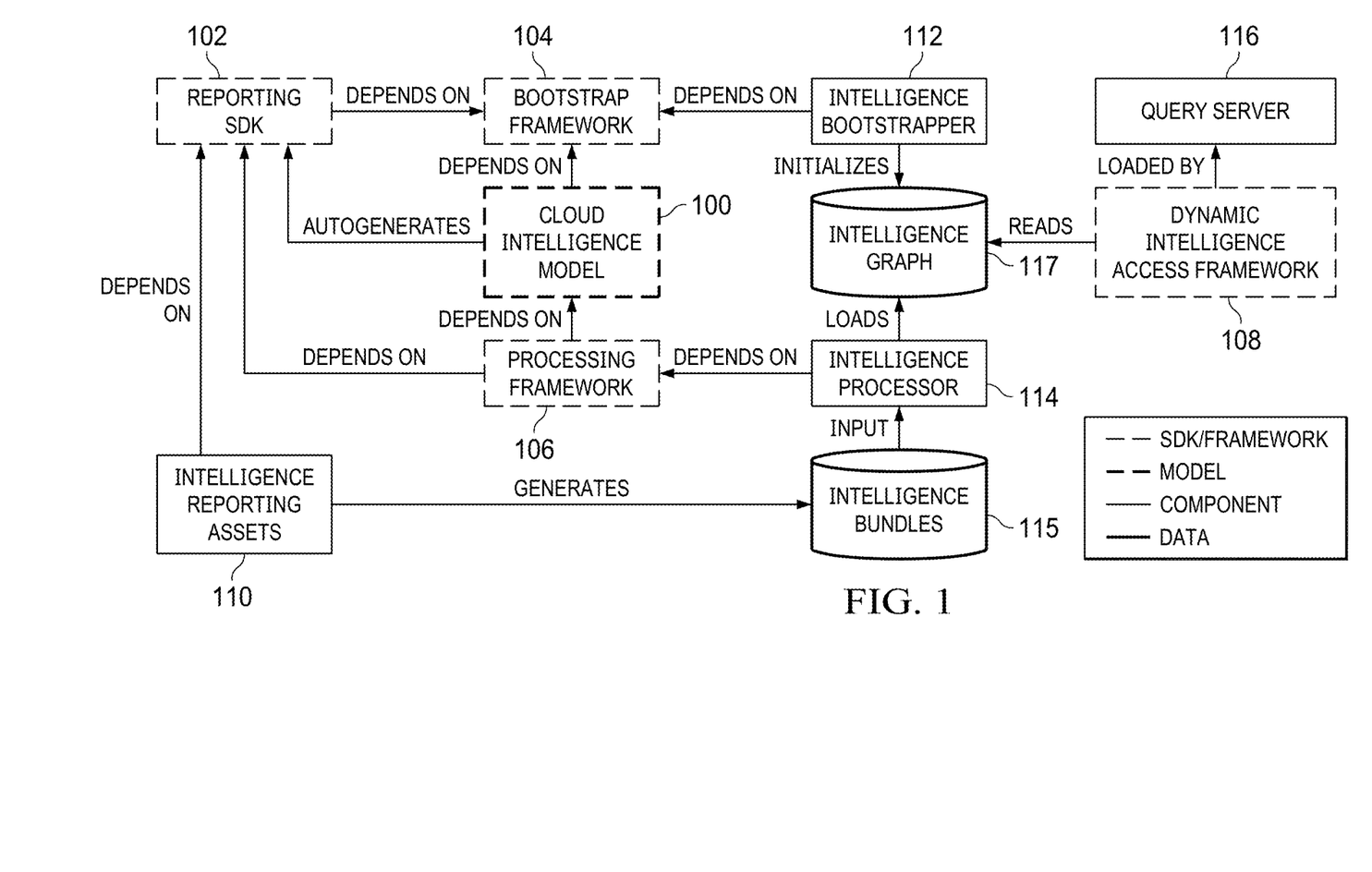
FIG. 1 depicts an architecture for a cloud risk intelligence framework in which the Cloud Security Control Platform (CSCP) according to this disclosure may be implemented.

As still further background, FIG. 1 depicts a framework architecture for a cloud risk management platform that provides the CDC service described above. Further details of this architecture is described in U.S. Pat. No. 10,728,307, the disclosure of which is hereby incorporated by reference. As disclosed there, the architecture comprises a number of software and data components or subsystems. The functional components need not be implemented as distinct elements, as various components may be combined with one another. Further, the components may execute independently of one another, and they may execute in different locations or using multiple computing entities. Typically, a computing entity that supports a component or data store is a computer or computing system that comprises one or more processors, storage and memory, network interfaces, etc. As depicted, typically the platform comprises cloud intelligence data model 100, a reporting Software Development Kit (SDK) 102, a set of one or more code frameworks, namely a graph bootstrap framework 104, an intelligence processing framework 106, and a dynamic intelligence framework 108, as well as various system components comprising intelligence reporting assets 110, an intelligence bootstrapper 112, an intelligence processor 114, and a query server 116. As noted, these components typically are implemented in software executing on hardware processing elements. One or more components may be combined with one another or execute as separate processes. The particular relationships and dependencies between and among the various components of the framework are depicted in FIG. 1 for explanatory purposes and are not intended to be limiting.

The cloud intelligence model 100 is central to the above-described framework, as it enables the CDC service to provide a subscriber a view of all identity and data activity in the enterprise's cloud accounts. Preferably, there is a cloud intelligence model developed and maintained for each subscriber to the service. Typically, this model is decoupled from the actual technical implementation in the reporting SDK 102, the code frameworks, and the processing components, although each of which depend on this model closely. In a representative, but non-limiting embodiment, the model 100 is a cloud environment data model for a particular subscriber that is based on observed patterns across multiple cloud environments. As will be described, this solution provides a unified approach to modeling data, identity, infrastructure and protection. Preferably, the model 100 comprises an object model (e.g., all cloud entities and their corresponding properties, the allowed connections between and among cloud entities, and multi-level interfaces for the cloud entities), storage properties (e.g., index, types, etc.) for all or some of the above, and query properties of the object model.

Several of the components depicted in FIG. 1 typically are supported using computing systems and services technologies configured as follows. The cloud intelligence model 100 is pre-processed to generate the reporting SDK 102, which it then embedded into the code comprising the intelligence reporting assets subsystem 110; the intelligence reporting assets 110 (which include the embedded reporting SDK as auto-generated from the pre-processed cloud intelligence model) in turn reside within the cloud computing resources (systems, sub-systems, etc.) that are to be monitored by the cloud intelligence system of this disclosure. Thus, for example, the intelligence reporting assets 110 are configured to execute within or in association with a particular cloud computing system or resource (e.g., an Amazon® container running DynamoDB, etc.) and, as a result of that monitoring the intelligence reporting assets 110 generate the intelligence bundles 115. An intelligence bundle 115 thus is generated for each particular cloud compute deployment that is being monitored. The intelligence bundle 115 includes the information about the cloud accounts, resources, etc. that the subscriber has provisioned in or is other using in each such cloud compute deployment. In a representative implementation, the service provider deploys a Docker container or the like (that maintains the intelligence reporting assets 110 and the embedded reporting SDK 102) in the third party cloud computing deployment for support of the data collection. Typically, data collection with respect to a particular cloud deployment (and for a particular customer) occurs during an initial discovery phase, and then runs continuously thereafter (e.g., nightly). As noted, the intelligence reporting assets subsystem 110 collects that data from the external cloud deployment(s) and generates the one or more intelligence bundles 115. As noted, a bundle is associated with an enterprise subscriber and encapsulates the subscriber's data (e.g., identity and data activity, etc.) retrieved from each cloud deployment being used by the subscriber. The intelligence processor 114 receives an intelligence bundle and processes it under the control of the processing framework 106, thereby generating an intelligence graph 117 (subscriber-specific). Because the processing framework depends on the cloud intelligence model 100, and because the intelligence processor 114 depends on the processing framework 106, the model 100 is embedded/instantiated in the intelligence graph 117. An initial version of the intelligence graph is initialized by the intelligence bootstrapper 112, and the intelligence graph is updated (by the intelligence processor 114) as the intelligence bundle 115 is updated (by changes in the local cloud compute deployment, as reported by the intelligence reporting asserts 110). The intelligence graph 117 is configured to be queried by a query server 116, which executes on an application server subsystem and, together with a web server, preferably exposes a query-able display interface (e.g., as a set of web pages) to authenticated and authorized enterprise users. Typically, an enterprise user interacts with the query server subsystem using a client browser or mobile app.

FIG. 1 also depicts the various dependencies and interactions among the components and data elements that are described above. As shown, the bootstrap framework 104, the processing framework 106 and the intelligence processor 114 depend on the cloud intelligence data model 100. As described, the intelligence processor 114 also receives as input the intelligence bundle(s) 115 that are generated by the cloud-deployed intelligence reporting assets subsystem 110 (which as noted also includes the embedded reporting SDK itself generated from the model). The processing framework 106 processes the data model (in the manner described below in more detail) and provides results of such processing to the intelligence processor subsystem 114, which in turn generates the intelligence graph 117 that is exposed to a dynamic intelligence access framework 108 loaded by the query server 116 to thereby respond to data queries. As noted above, typically each cloud intelligence data model (one per subscriber) has an associated intelligence graph 117. The intelligence graph 117 is a knowledge-based structure of edges and nodes that is generated by an intelligence bootstrapper component 112, which in turn depends on a bootstrap framework 104 that receives the data model as input. Upon initialization, the data model (and associated data) is stored inside the intelligence graph.

Generalizing, these subsystems and data structures interact in the manner depicted in FIG. 1 to collect, organize, manage and display the data to the subscriber via the above-described query-able dashboards. Further details regarding these components are provided below.

As noted above, and to provide the CDC service to a participating subscriber, the system generates and manages a cloud intelligence data model for each subscriber. As noted above, the data model is stored inside the intelligence graph upon startup. A representative data model schema that supports this data model is now described. This data model schema is not intended to be limiting, as other model structures may be leveraged.

Figure 2:
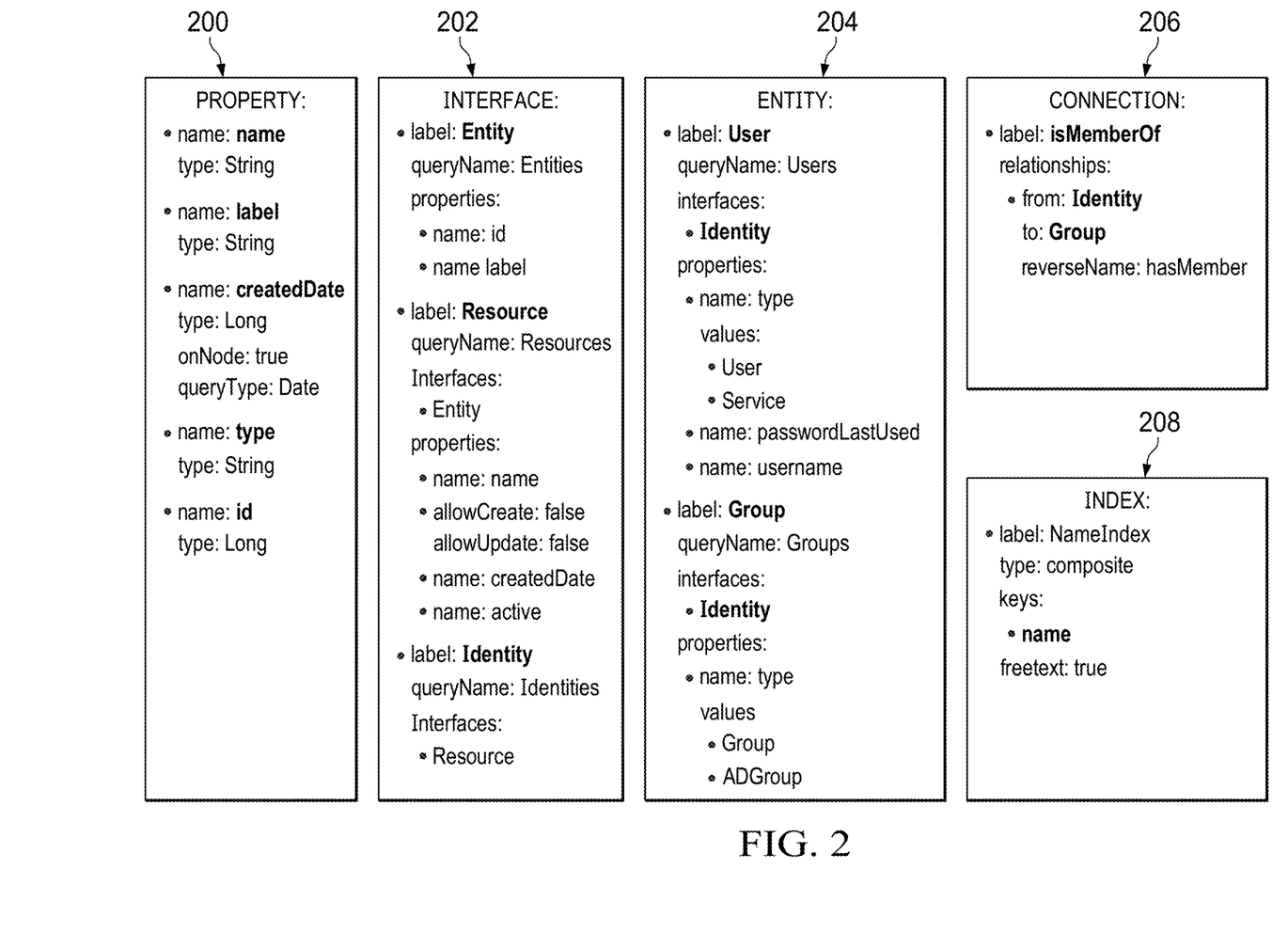
FIG. 2 is a unified cloud intelligence data model that may be leveraged by the CSC platform.

In this example data model schema, FIG. 2 depicts a sample from the model 100 with respect to objects referred to herein as Users and Groups. As depicted, the model preferably defines properties 200, interfaces 202, entities 204, connections 206 and indexes 208. Within each of these definitions are pieces of information that are collected, managed and leveraged by the various parts of the framework. The following provides additional examples of these representative portions of the data model.

The following is a representative scheme for the property definition (Attribute|Description): name|Name of the property; type|the storage type for the property; onNode|directs storage to either put the property on the entity or not; queryType|the type to use in the query interface (e.g., in FIG. 2, the createdDate is stored as Long but queried as Date).

Interface definitions are primarily used for reporting and querying data. They need not be stored in the data store. The concept of interfaces allows the hierarchy of a query to change the entities that are stored in the actual data store. Preferably, there are layers of inheritance that allow the framework to look for all entities that conform to a particular interface. For example, the sample in FIG. 2 directs the query server to return both User and Groups when the query asks for all contained Identities.

Preferably, Interfaces can also extend Interfaces. This is shown in FIG. 2, where the chain of User-Identity-Resource-Entity is represented from an inheritance point of view. The following is a representative scheme for the Interface definition (Attribute|Description): label|the name/label of the interface; queryName|the name used by the query/access framework; interfaces|any interfaces that the given interface extends; and properties|any properties that exist on the given interfaces, and any interface or entity that extends this interface will inherit these properties.

Entity definitions define entities that are used in reporting, querying and storage. They extend Interfaces but preferably do not extend each other. The following is a representative scheme for the Entity definition (Attribute|Description): label|the name/label of the interface; queryName|the name used by the query/access framework; interfaces|any interfaces that the given interface extends; and properties|any properties that exist on the given interfaces, and any interface or entity that extends this interface will inherit these properties.

In addendum to the properties defined above, properties preferably enforce types on the reporting and query layers. For instance, in the User entity defined in FIG. 2, the type is restricted to User or Service. This ensures integrity in the reporting and query sections of the framework.

The connection definitions allow the query framework to expose queries to the user, and for the storage framework to appropriately store relationships in the data model. Each connection preferably has a label and can contain multiple relationships (meaning multiple entities can use the same connection identifier). In the above example, which is merely representative, a relationship between Identity and Group is established, thereby defining that anything that extends Identity can have a "isMemberOf" connection with Group Entity. The following is a representative scheme for the Connection definition (Attribute|Description): label|the name of the connection relationship All the relationships preferably use this connect. Each relationship entry contains a: fromNode, a toNode, and a reverseName.

Index definitions are primarily used by the bootstrap and storage layers. They define what properties need to be indexed and how to support the use cases placed on the intelligence framework. The following is a representative scheme for the Index definition (Attribute|Description): label|the name of the index; type|the index type; keys|properties included by the framework (must be referenced in the property definition); and freetext|a flag identifying if the index is free text or not.

As referenced above, the reporting SDK depicted in FIG. 1 provides a means for reporting data that can be consistently consumed by the framework. Preferably, the reporting SDK is dynamically-generated from the intelligence model such that, as updates are made to the model, new reporting assets are easily produced using a newly-generated SDK. As implemented, typically the reporting SDK is embedded within the intelligence reporting assets that are deployed in the cloud compute environment to be monitored.

Further details of the above-described cloud intelligence data model are provided in the above-identified patent.

Cloud Security Control Platform (CSCP)

With the above as background, the techniques of this disclosure are now described.

As noted above, the Cloud Security Control Platform (CSCP) Platform herein presents an engine for applying controls to an organization's cloud environment. That environment could span a single account in one cloud provider or span many accounts across multiple cloud providers. The CSPC provides a mechanism for the administrator to apply the controls or to apply them as in a monitoring mode, and the CSCP leverages the above-described cloud intelligence data model and framework (e.g., the CDC service). As described, typically that model unifies information from multiple clouds, although as noted the techniques herein may be used in association with a single cloud provider environment. As will be described below, this model/engine provides the security control platform with the data necessary to understand the landscape of the cloud environment, identify areas where controls should be applied and ultimately measure security risk to show improvement before and after the CSCP is in place.

Figure 3:
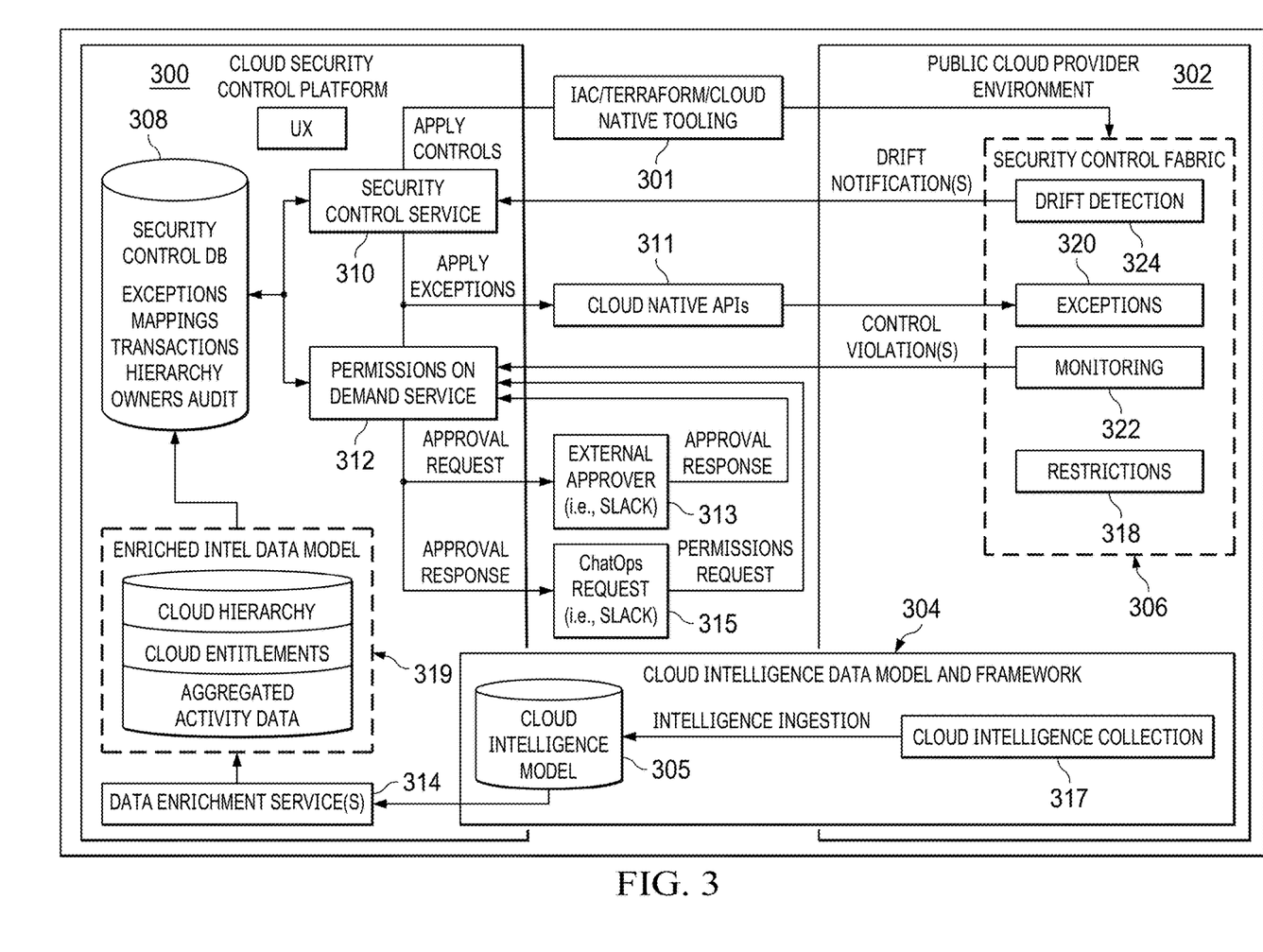
FIG. 3 depicts an implementation of the Cloud Security Control Platform of this disclosure.

FIG. 3 depicts the Cloud Security Control Platform (CSCP) 300 in association with a public cloud provider environment 302, which is representative. In one embodiment, the platform executes as cloud-based infrastructure and is network-accessible, e.g., via browsers or other applications, and authenticated and authorized users interact with the platform via a dashboard, one or more secure web pages, or the like. As noted above, typically an enterprise is associated with multiple of these public cloud provider environments. Representative environments are Amazon® AWS, Microsoft® Azure, Google® Public Cloud, and others. In a representative embodiment, the approach herein is comprised of the following parts (each described in detail below) that map to the above "high-level" architecture diagram in FIG. 3 as follows: a Cloud Intelligence Data Model and Framework 304, a Public Cloud Provider Security Control Fabric (SCF) 306, a Security Controls Database 308, a Security Control Service 310, a Permissions on Demand Service 312, and a Data Enrichment Service(s) 314. As depicted, and in this embodiment, the Security Control Fabric 306, which typically is generated by the CSCP, is configured within the third party cloud (e.g., by Infrastructure-As-Code (IAC) or other cloud-native tooling 301) to facilitate the control functionality described below. Given the differences between and among the various third party public clouds, typically each SCF 306 is specific to a particular public cloud.

As noted above, the cloud security control platform provides a means to apply security controls across public cloud environments (via a cloud-specific SCF 306) while providing the organization the means to dynamically grant exceptions and monitor for violations. As depicted, one or more cloud native Application Programming Interfaces (APIs) 311 may be used for this purpose.

The Data Enrichment Services 314 provide a means to extract the complete cloud hierarchies, entitlements and aggregated activity information from the cloud intelligence models in the public environments.

The Cloud Intelligence Data Model and Framework 304 provides a means for resources, their activity and their associated permissions to be collected 317 and normalized across multiple cloud providers and accounts. The resulting Cloud Intelligence Model 305 provides Cloud Hierarchy Structure to be processed by the Data Enrichment Services 314 into an Enriched Data Model 319 and fed to the Security Controls Database 308. Activity Data processed by the Data Enrichment Services 314 fed to the Security Controls Database 308 to identify: what identities have used sensitive services, and what services are actually in use in the cloud hierarchy. In addition, Owner and Approver Data is also extracted by Data Enrichment Services 314 and provided to the Security Controls Database 308. Further details regarding the intelligence collection and modeling have been described above in connection with FIG. 1, which as noted above is representative. The CSCP may leverage other techniques for data collection and modeling.

By way of additional background, the various third party cloud providers define their cloud infrastructures in different ways, and the SCP is configured to be aware of these differences. Several examples of this differentiation are set forth below for some common cloud service providers. To facilitate this cross-cloud provider implementation, the SCP leverages several base concepts, namely, scope and root scope, and cloud security controls, which are now described.

Figure 4:
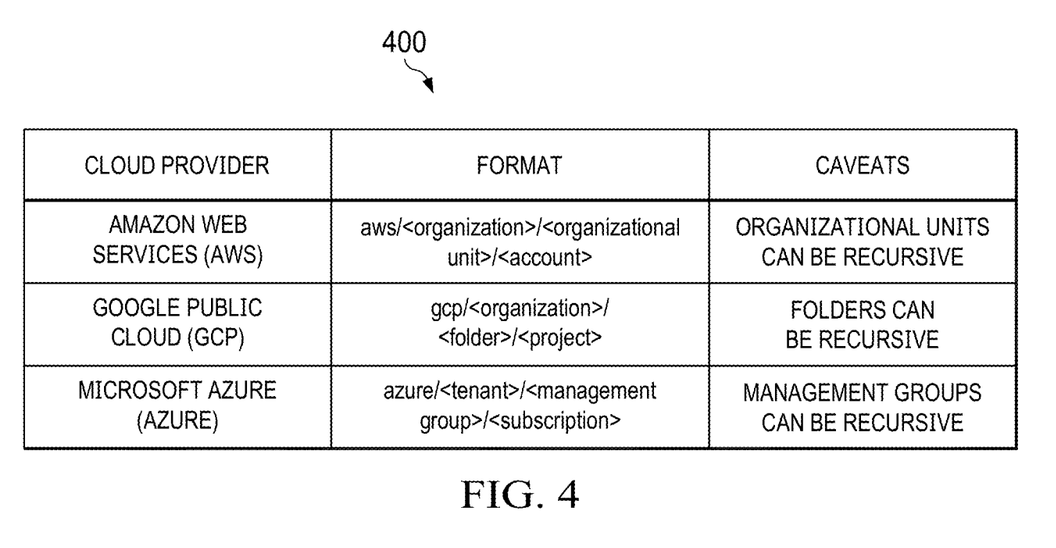
FIG. 4 depicts how third party cloud providers delimit paths into their respective cloud infrastructures.

Scope is a "/" delimited path into a cloud infrastructure. A scope of "/" refers to the entire cloud. The contents of the scope present themselves differently depending on the cloud provider. In the table 400 depicted in FIG. 4, the scope is presented for Amazon® Web Services (aws), Google® Public Cloud (gcp) and Microsoft® Azure® (azure) public cloud environments, which are merely representative. Root scope simply refers to the highest level of the scope. For example the root scope of any AWS scope would be aws/<organization>. As will be described further below, preferably scopes are normalized and then used by the Security Control Platform to understand how to optimally apply the requested security controls.

As previously explained, and with respect to permissions in particular, the control paradigm of this disclosure operates in a distinctly different manner than prior approaches, wherein developers provision identities at will and permissions are granted on an identity basis (identity by identity). In the CSCP, and with respect to permissions, this identity-centric notion is inverted, and instead the security is evaluated on a permission-by-permission basis, with the default being that a set of permissions (e.g., all permissions) are denied and then only given to a particular identity on an as-needed basis. The set of permissions is configurable. In other words, and in contrast to the prior paradigm, the notion is that (the set of) permissions are always denied, typically at a specified scope (which may be the entire cloud), and then only selectively allowed (with respect to the scope) for a particular identity thereafter. In a typical operating scenario, and while the Security Control Service 310 is initially configured using the permissions of a privileged user, the permissions for a given identity are done, usually in real-time, by the platform in an automated manner using the Permissions On Demand Service (or as otherwise necessary by an associated human approver 313 or via a ChatOps request 315). Thus, users of the cloud provider can continue to grant permissions in the same fashion they did before; however, if those permissions are deemed sensitive and controlled by the SCP, they will not be able to be used unless a Permissions On Demand or other approval (e.g., 313 or 315) is performed.

As noted above, and given the differences across the public cloud providers, the particular security control policy for a given cloud typically will vary. Stated another way, and as mentioned above, the SCF implemented within a particular cloud will vary to take into account the scopes and configuration semantics that are unique to each provider. Thus, for example, in AWS, an SCP (security control policy) is applied at the specified scope(s) with a single DENY statement containing all blocked services. In Azure, two Azure policies are applied at the specified scope(s) to disable a given service, one which has a deny effect, and the other that has a denyAction effect. In GCP, a Service Usage is used to disable any enabled services at a project level. These examples are not intended to be limiting. As noted, each SCF will take into account the particular manner in which the public cloud implements its controls.

Generalizing, Cloud Security Controls are pre-defined restrictions supplied to the platform as base content that are available to the administrator of the Cloud Security Control platform to apply at any scope in their cloud environment. Security Controls can be divided into the following categories: Service Block Controls, Region Block Controls, Sensitive Permission Controls, and Resource Configuration/Creation Controls. Service Block Controls block the use of a given service at the applied scope and below. For example if a service is blocked at a root scope it will be blocked in all inherited scopes. Region Block Controls block the use of a given region for a given root scope. Sensitive Permission Controls block the use of certain permissions on a service at a given scope and all inherited scopes. Sensitive Permission Controls can have exceptions, which may be specific to a small part of the scope. Resource Configuration/Creation Controls restrict the way that resources can be created at scopes in the environment. These controls can have exceptions. An example of such control would be blocking the creation of Public API Gateways in certain scopes of the environment. While the remainder of the description below focuses on use of the Sensitive Permissions Controls as a preferred embodiment, this is not a limitation, as the Cloud Security Controls may be implemented without necessarily including the permissions control, although this will be the usual case.

Figure 5:
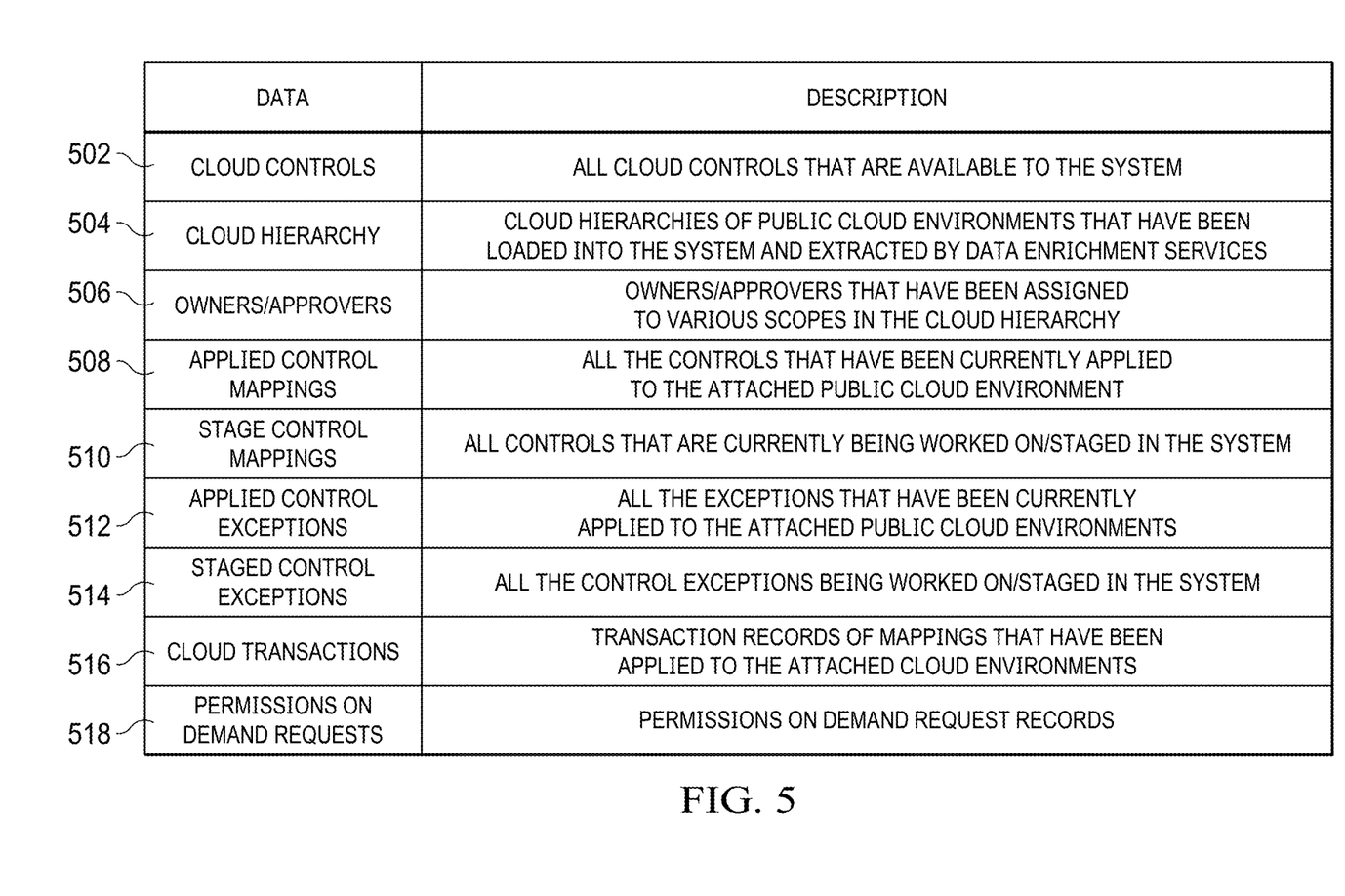
FIG. 5 depicts a representative organization of a security controls database that houses data used by the platform in one embodiment.

FIG. 5 depicts the data types stored in the Security Controls Database 308, which stores the data used by the security control platform. In this embodiment, these type include Cloud Controls 502, Cloud Hierarchy 504, Owners/Approvers 506, Applied Control Mappings 508, Stage Control Mappings 510, Applied Control Exception 512, Staged Control Exceptions 514, Cloud Transactions 516, and Permissions on Demand Requests 518. Cloud Controls 502 are all the controls that are available to the system. The Cloud Hierarchy 504 defines all of the hierarchies of public cloud environments that have been loaded into the system and extracted by Data Enrichment Services 314. The Owners/Approvers 506 are the owners or approvers that have been assigned to various scopes in the cloud hierarchy. The Applied Control Mappings 508 are the controls that have been currently applied to an public cloud environment attached to the SCP. The Stage Control Mappings 510 are controls that are currently being worked on or staged in the system. The Applied Control Exception 512 are the exceptions that have been currently applied to the attached public cloud environments. The Staged Control Exceptions 514 are the control exceptions being worked on or staged in the system. The Cloud Transactions 516 are in the form of transaction records of mappings that have been applied to the attached cloud environments. The Permissions On Demand Requests 518 are the records of the on-demand requests received by the SCP.

Figure 6:
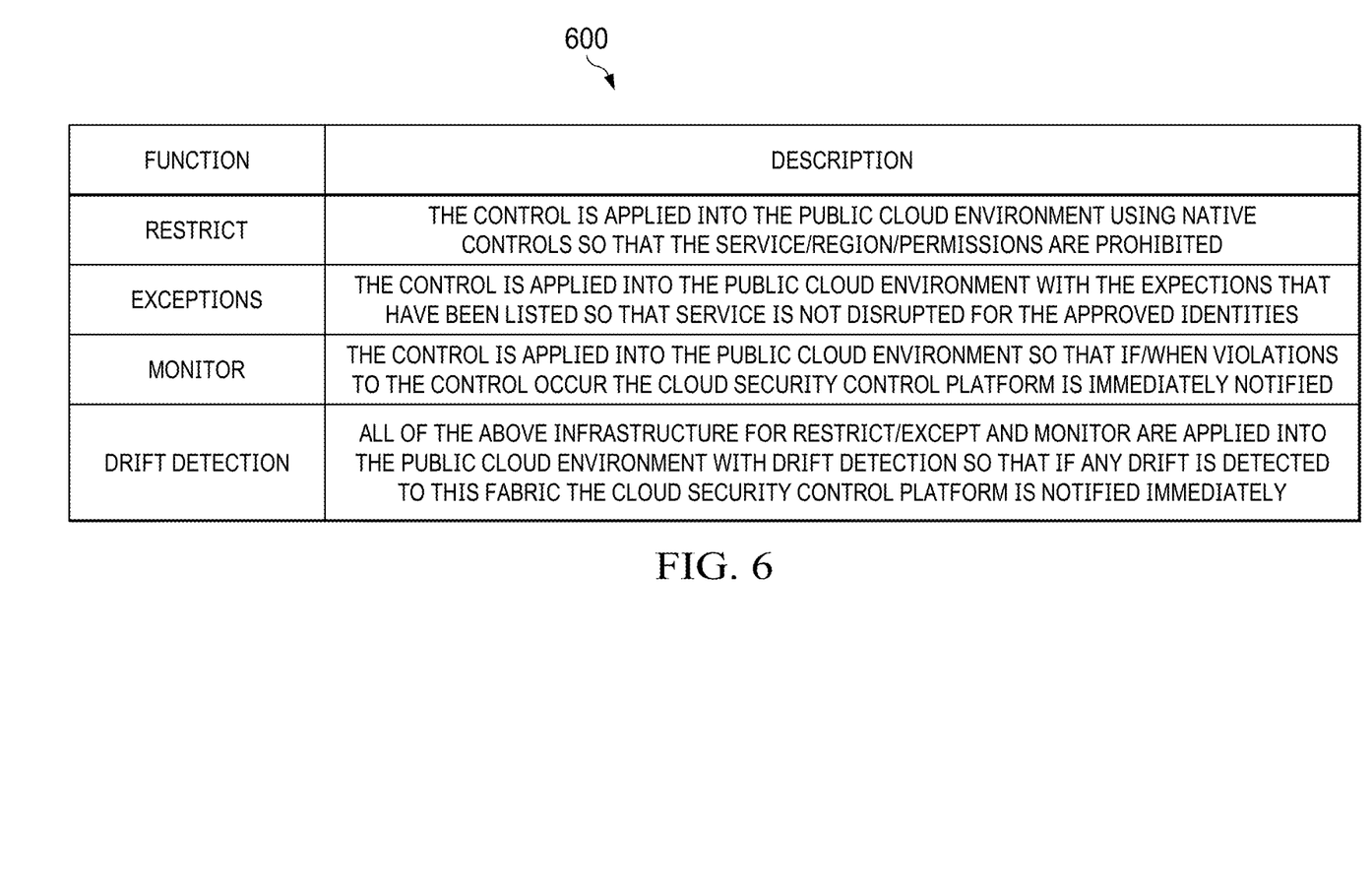
FIG. 6 depicts a representative security control fabric that identifies a set of controls that may be implemented within a third party cloud by the platform of this disclosure.

The Public Cloud Provider Security Control Fabric 306 produced by the platform are capabilities native to each public cloud provider. Every public cloud provider has many unique ways of restricting access or capabilities and implementing exceptions to these restrictions. For the SCP, typically the capabilities implemented provide four (4) distinct functions as defined in the table in FIG. 6. Referring now also back to FIG. 3, these include Restrictions 318, Exceptions 320, Monitoring 322 and Drift Detection 324. A Restrictions 318 is a control applied into the public cloud environment, typically using native controls, so that the service/region/permissions are prohibited. With respect to a control that has been applied into the public cloud environment, an Exception 320 refers to the exceptions that have been listed so that service is not disrupted for one or more approved identities. For a control that has been applied into the public cloud, Monitoring 322 provides for the capability to notify the CSCP if/when violations to the control occur. Further, the above infrastructure for Restrictions, Exceptions and Monitoring are applied into the public cloud environment with Drift Detection 324 so that if any drift is detected to this fabric the CSCP is notified, preferably immediately. It is not required that all of these functions are implemented within a particular Security Control Fabric, and one or more of such functions can be combined.

The Security Control Service 310 provides the function of applying controls that have been staged in the Security Controls Database 308 to the public cloud provider environment along with any exceptions that may exist. Preferably, these controls are rolled into a transaction and Cloud Native Tooling 301 is built and applied to the public cloud environment. This control service is also responsible for receiving drift notifications from the cloud provider environment Drift Detection 324 and re-applying the control so that the control state of the system is not altered. Typically, the Security Control Service 310 is configured using the permissions of a privileged user while permissions-on-demand are carried out in realtime, as now described.

The Permissions on Demand (POD) Service 312 is the mechanism in the Cloud Security Control Platform 300 that provides the following functions: receiving Control Violations and routing them to external approvers 313; receiving Control Exception Approvals and applying them in the public cloud environment (e.g., via APIs 311); receiving ChatOps (315) driven Permission Requests and routing them to external approvers 313; and sending approval responses. The POD Service 312 reduces the friction in the organization after controls have been applied. Identities can violate controls and that violation will be routed to the appropriate owner through external communication tools (i.e. Slack® or Teams®) so that approval can be granted.

The following describes an example embodiment for a representative cloud service provider, here AWS. By way of brief background, AWS S3, or Simple Storage Service, is an object storage service that allows businesses to store and retrieve any amount of data. S3 permissions are the explicit directives within policies that determine who can access the service entirely and more specifically the objects within it. AWS operates on a shared responsibility model. While AWS manages the security of the cloud, customers are responsible for securing the services they use, including data protection in S3. There are a variety of IAM policies (at the identity, resource, and organizational level) that can be implemented. The following describes further aspects of the S3 service, and the IAM policies to secure it.

Typically, in AWS there are different configuration options when wanting to control access to S3 buckets and individual objects. An S3 object is any file or data stored in S3. Each object has associated metadata and can be uniquely identified within a bucket-a bucket is a container for a collection of objects (files). Individual objects are what contain sensitive data and for which access is sought to be controlled. User policies are attached to IAM users or groups and define permissions for S3 operations. They are identity-based policies that detail how an identity can interact with S3 buckets and S3 objects. Bucket policies are attached directly to an S3 bucket. They are used to grant or deny access to the objects within the bucket from different AWS accounts. They are resource-based policies. ACLs provide another layer of control over access to buckets and objects. Every bucket and object has an ACL attached to it defining what entities can access it and what actions they can perform. S3 permissions and access are managed using ACLs or bucket and user policies.

S3 policies, whether at the bucket or identity level, have the following components in JSON format: Effect, Principal, Actions, Resource and Condition. The Effect defines whether the actions are allowed ("Effect": "Allow") or denied ("Effect": "Deny"). The Principal specifies the user, account, service, or other entity that is allowed or denied access to the resource. Actions determine what operations are allowed or denied. Resources specify the S3 resource to which the policy applies. Conditions specify the circumstances under which the policy grants or denies permission.

Using AWS S3 by way of example, the CSCP may then implement one or more security controls that are then implemented (as an SCF) as has been previously described. In particular, the following security controls are configured. To block services, an AWS SCP (Security Control Policy) is applied at one or more specified scope(s), as noted preferably with a single DENY statement containing all blocked services. To restrict sensitive permissions, and for users, groups and roles, an AWS SCP is specified and applied at the specified scope(s). For an SSO role, preferably CMPs are added to each account within the specified scopes associated with the role and applied to a permission set. As noted above, according to the security paradigm herein, all permissions (within a particular scope) are denied by default. The CSCP is notified of the denied permissions by provisioning an EventBridge rule in each account and AWS region that forwards those denied permissions to the CSCP for approval. For users and roles, Identities may be selectively exempted from these controls by a Principal tag applied to the Identity. For SSO roles, the CMP is updated to exclude the given role "ARN" in the accounts within the specified scopes. In a typical implementation, and within a particular scope, the following permissions are then permitted: POD role permissions, and deployment script permissions. These permissions are configured and enabled by providing an AWS CloudFormation template, and such templates also can be used to de-provision one or more SCP controls. In this example embodiment, CSCP controls are tagged with a particular key-value pair, such as sonrai-tag: control. CSCP deny policies are put in place to block actions on the protected resources, and to block users from tagging other resources with this key-value pair. Another tag, such as sonrai-exemption-tag: <service> used for permissions-on-demand is protected by the CSCP to block tagging/untagging of existing identities, and to block creation of new identities with this tag.

The above-described example is not intended to be limiting. As noted, different public cloud providers manage identities and permissions using different controls or semantics, and the CSCP is configured to work seamlessly, reliably and securely across multiple such cloud environments.

The CSCP provides significant advantages. In particular, the amount of potential/unnecessary risk in a cloud environment is reduced substantially. Through the applications of controls to block services, regions and sensitive permissions a lot of movement and data access in the cloud environments will be restricted to the zones where it is required. It addresses the security risks of developers continuing to provision identities at will by enabling risky permissions to be controlled by the security team. Further, when a user needs to use something, it can be approved quickly through Permissions on Demand. The SCP enables continuous auditing of what controls are enabled and who approved them across a large cloud environment. Further, the SCP facilitates frictionless security design. Security Controls are designed and observed without breaking a running system. The nature of the cloud security control platform allows security controls to be applied, typically in a monitor mode. This allows the security administrator to test the application of controls before actually hardening the cloud environment.

While the above description sets forth a particular order of operations performed by certain embodiments, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject disclosure also relates to apparatus for performing the operations herein. This apparatus may be specially constructed for the required purposes, or it may comprise a general-purpose computing entity selectively activated or reconfigured by a stored computer program. Such a computer program may be stored in a computer readable storage medium, such as, but is not limited to, any type of disk including an optical disk, a CD-ROM, and a magnetic-optical disk, flash memory, a read-only memory (ROM), a random access memory (RAM), a magnetic or optical card, or any type of non-transitory media suitable for storing electronic instructions.

While given components of the system have been described separately, one of ordinary skill will appreciate that some of the functions may be combined or shared in given instructions, program sequences, code portions, and the like.

A given implementation of the computing platform is software that executes on a hardware platform running an operating system such as Linux. A machine implementing the techniques herein comprises a hardware processor, and non-transitory computer memory holding computer program instructions that are executed by the processor to perform the above-described methods.

The functionality may be implemented with other application layer protocols besides HTTP/HTTPS, or any other protocol having similar operating characteristics.

There is no limitation on the type of computing entity that may implement the client-side or server-side of the connection. Any computing entity (system, machine, device, program, process, utility, or the like) may act as the client or the server.

While given components of the system have been described separately, one of ordinary skill will appreciate that some of the functions may be combined or shared in given instructions, program sequences, code portions, and the like. Any application or functionality described herein may be implemented as native code, by providing hooks into another application, by facilitating use of the mechanism as a plug-in, by linking to the mechanism, and the like.

The platform functionality may be co-located or various parts/components may be separately and run as distinct functions, perhaps in one or more locations (over a distributed network).

The techniques herein provide for improvements to another technology or technical field, namely, data analytics tooling, applications and systems, as well as improvements to cloud computing infrastructures that support such functions and technologies.

A cloud security control platform as described and depicted may be implemented within a cloud compute infrastructure, or as an adjunct to one or more third party cloud compute infrastructures. In a preferred embodiment, and as depicted and described, the CSCP is implemented in whole or in part by a service provider on behalf of entities (e.g., enterprise customers) that use third party cloud computing resources. A typical implementation provides for cloud risk control-as-a-service in the manner described herein. Portions of the cloud risk control system may execute in an on-premises manner within or in association with an enterprise or a particular public cloud provider environment. The CSCP also comprises a web-accessible portal (e.g., an extranet application) that is accessible via a browser or mobile app via HTTP/HTTPS, or other protocol.

Communications between devices and the cloud risk control system are preferably authenticated and secure (e.g., over SSL/TLS).

While the techniques have been described in the context of enterprise roles, groups and accounts that are propagating permissions, this is not a limitation, as the methods herein (i.e., use of IAAPs and the above-described algorithms) may be used similarly to identify other cloud identity constructs that have similar effects.

Various components or functions of the CSCP (e.g., the permissions-on-demand functionality) may be configured to operate within the cloud environment(s) themselves. In such cases, the techniques or functions are implemented locally or on-premises with respect to a particular cloud environment.

What is claimed is:

1. A method implemented in a security control platform to enforce scope-based security controls, comprising:
   providing a cloud intelligence data model that, for a particular enterprise, associates resources, activities and associated permissions associated with multiple cloud providers and accounts;
   with respect to a given cloud provider of the multiple cloud providers used by the particular enterprise, identifying a scope, wherein the scope is any point within a delimited path into a particular cloud environment of that given cloud provider, wherein the given cloud provider and at least one other cloud provider of the multiple cloud providers define contents of a respective scope differently from one another;
   normalize the identified scope for use by the security control platform to optimally apply a security control;
   based at least in part on the cloud intelligence data model, configuring a security policy for the particular cloud environment of the given cloud provider, the security policy by default denying all permissions with respect to the identified scope;
   instantiating the security policy in the particular cloud environment of the given cloud provider of the multiple cloud providers used by the particular enterprise; and
   using the instantiated security policy, and with respect to the identified scope associated with the given cloud provider, implementing permissions-on-demand with respect to one or more identities within the particular cloud environment.

2. The method as described in claim 1 wherein the permissions-on-demand include receiving and automatically applying control exception approvals directly in the particular cloud environment.

3. The method as described in claim 1 wherein the permissions-on-demand include receiving and routing to external approvers control violations or permission requests.

4. The method as described in claim 3 wherein an external approver is distinct from an individual that manages the particular cloud environment at the identified scope.

5. The method as described in claim 1, wherein the security policy applies one of a set of predefined restrictions, the predefined restrictions being use of a given service at the identified scope, use of a given region for the identified scope, use of one or more permissions on a service at the given scope together with inherited scopes, and creation of resources at the identified scope.

6. The method as described in claim 5 wherein the security policy is applied via infrastructure-as-code that is specific to the particular cloud environment.

7. The method as described in claim 1 wherein the scope is an entirety of the particular cloud environment.

8. The method as described in claim 1 further including enabling a preview mode that enables identification of cloud entities that violate the security policy.

9. The method as described in claim 1 implemented as-a-service.

10. The method as described in claim 1 wherein the set of permissions are configurable.

11. An apparatus, comprising:
at least one hardware processor; and
computer memory associated with the hardware processor and holding computer software, the computer software comprising program code configured as a security control platform to be executed by the hardware processor to enforce scope-based security controls, the program code configured to:
manage a cloud intelligence data model that, for a particular enterprise, associates resources, activities and associated permissions associated with multiple cloud providers and accounts;
with respect to a given cloud provider of the multiple cloud providers used by the particular enterprise, identifies a scope, wherein the scope is any point within a delimited path into a particular cloud environment of that given cloud provider, wherein the given cloud provider and at least one other cloud provider of the multiple cloud providers define contents of a respective scope differently from one another;
normalize the identified scope for use by the security control platform to optimally apply a security control;
based at least in part on the cloud intelligence data model, configures a security policy for the particular cloud environment, the security policy by default denying all permissions with respect to the identified scope;
instantiates the security policy in the particular cloud environment of the given cloud provider of the multiple cloud providers used by the particular enterprise; and
using the instantiated security policy, and with respect to the identified scope associated with the given cloud provider, implements permissions-on-demand with respect to one or more identities within the particular cloud environment.

12. A method implemented in a security control platform to enforce scope-based security controls, comprising:
providing a cloud intelligence data model that, for a particular enterprise, associates resources, activities and associated permissions associated with multiple cloud providers and accounts;
providing one or more pre-defined restrictions that are configured to be enforced with respect to a cloud environment;
with respect to a given cloud provider of the multiple cloud providers used by the particular enterprise, identifying a scope, wherein the scope identifies a delimited path into a particular cloud environment of that given cloud provider, wherein the scope is normalized and used by the security control platform to optimally apply a requested security control, wherein the given cloud provider and at least one other cloud provider of the multiple cloud providers define contents of a respective scope differently from one another;
based at least in part on the cloud intelligence data model, configuring a security policy for the particular cloud environment of the given cloud provider, the security policy configured to apply at least one of the pre-defined restrictions to the identified scope; and
instantiating the security policy in the particular cloud environment of the given cloud provider of the multiple cloud providers used by the particular enterprise.

13. The method as described in claim 12 wherein the pre-defined restrictions are one of: Service Block Controls, Region Block Controls, Sensitive Permission Controls, and Resource Configuration/Creation Controls.

\* \* \* \* \*